US010069971B1

(12) United States Patent
Shaw et al.

(10) Patent No.: US 10,069,971 B1
(45) Date of Patent: Sep. 4, 2018

(54) AUTOMATED CONVERSATION FEEDBACK

(71) Applicant: Amazon Technologies, Inc., Seattle, WA (US)

(72) Inventors: Ronn Neal Shaw, Henderson, NV (US); Guam Wen William Wang, Henderson, NV (US)

(73) Assignee: Amazon Technologies, Inc., Seattle, WA (US)

( * ) Notice: Subject to any disclaimer, the term of this patent is extended or adjusted under 35 U.S.C. 154(b) by 128 days.

(21) Appl. No.: 14/572,547

(22) Filed: Dec. 16, 2014

(51) Int. Cl.
*H04M 3/00* (2006.01)
*H04M 3/51* (2006.01)

(52) U.S. Cl.
CPC ....... *H04M 3/5175* (2013.01); *H04M 3/5133* (2013.01)

(58) Field of Classification Search
CPC ...... H04M 3/5175; H04M 3/51; H04M 3/523; H04M 3/42221
USPC .......................... 379/265.01–265.03, 265.07
See application file for complete search history.

(56) References Cited

U.S. PATENT DOCUMENTS

| 6,795,808 | B1* | 9/2004 | Strubbe | G06F 17/30702 704/270 |
| 8,340,964 | B2* | 12/2012 | Konchitsky | G10L 25/78 379/376.02 |
| 2003/0108241 | A1* | 6/2003 | Colmenarez | G06F 17/30265 382/181 |
| 2008/0025477 | A1* | 1/2008 | Farhan | G06Q 50/22 379/38 |
| 2010/0323332 | A1* | 12/2010 | Keim | G09B 29/06 434/157 |
| 2013/0176413 | A1* | 7/2013 | Lowry | H04M 3/5175 348/77 |
| 2014/0140496 | A1* | 5/2014 | Ripa | H04M 3/5133 379/265.06 |

* cited by examiner

*Primary Examiner* — Rasha Al Aubaidi
(74) *Attorney, Agent, or Firm* — Lee & Hayes, PLLC

(57) ABSTRACT

Visual communication feedback may be provided to a participant of a communication. In various embodiments, systems and/or techniques may analyze a communication involving participants and provide the visual communication feedback for one of more of the participants during or after the conversation. The visual feedback may enable a participant to improve communication or otherwise provide more effective communication during a conversation and/or in subsequent conversations. The conversation may be a voice call conversation and/or a text-based conversation. The visual communication feedback may be provided in real-time, near real-time (i.e., during the communication), or after the communication, possibly as a summary or training tool.

20 Claims, 10 Drawing Sheets

AUTOMATED CONVERSATION FEEDBACK

BACKGROUND

Most organizations that interact with users (or customers) often provide some level of customer support. Customer support may involve providing detailed written instructions, providing a frequently asked question (FAQ) listing, and/or providing "live" help during a support session. The support session may be conducted at least partially by a customer service (CS) agent that may interact with a user via a voice call, by exchanging text-based messages, and/or by allowing the CS agent to access the user's device (e.g., remote assistance, etc.).

Typically, a user seeks assistance from a CS agent after the user has been unable to resolve a problem without help from the CS agent. Through use of a telephone call, instant messages, emails, or other non-facing communications, the CS agent may provide assistance to the user. Thus, the CS agent may then help the user without the benefit of seeing visual cues from the user, which if visible may help the CS agent gauge success of the CS agent's actions. Further, the CS agent may not be wholly self-aware during a conversation, and thus may unknowingly speak at a high volume, use improper grammar, or otherwise exhibit poor communication during a conversation.

Customer support is expensive to provide to users. Therefore, organizations desire to minimize use of customer support and minimize length of support sessions involving users while satisfying users' requests by providing helpful assistance during the support sessions.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
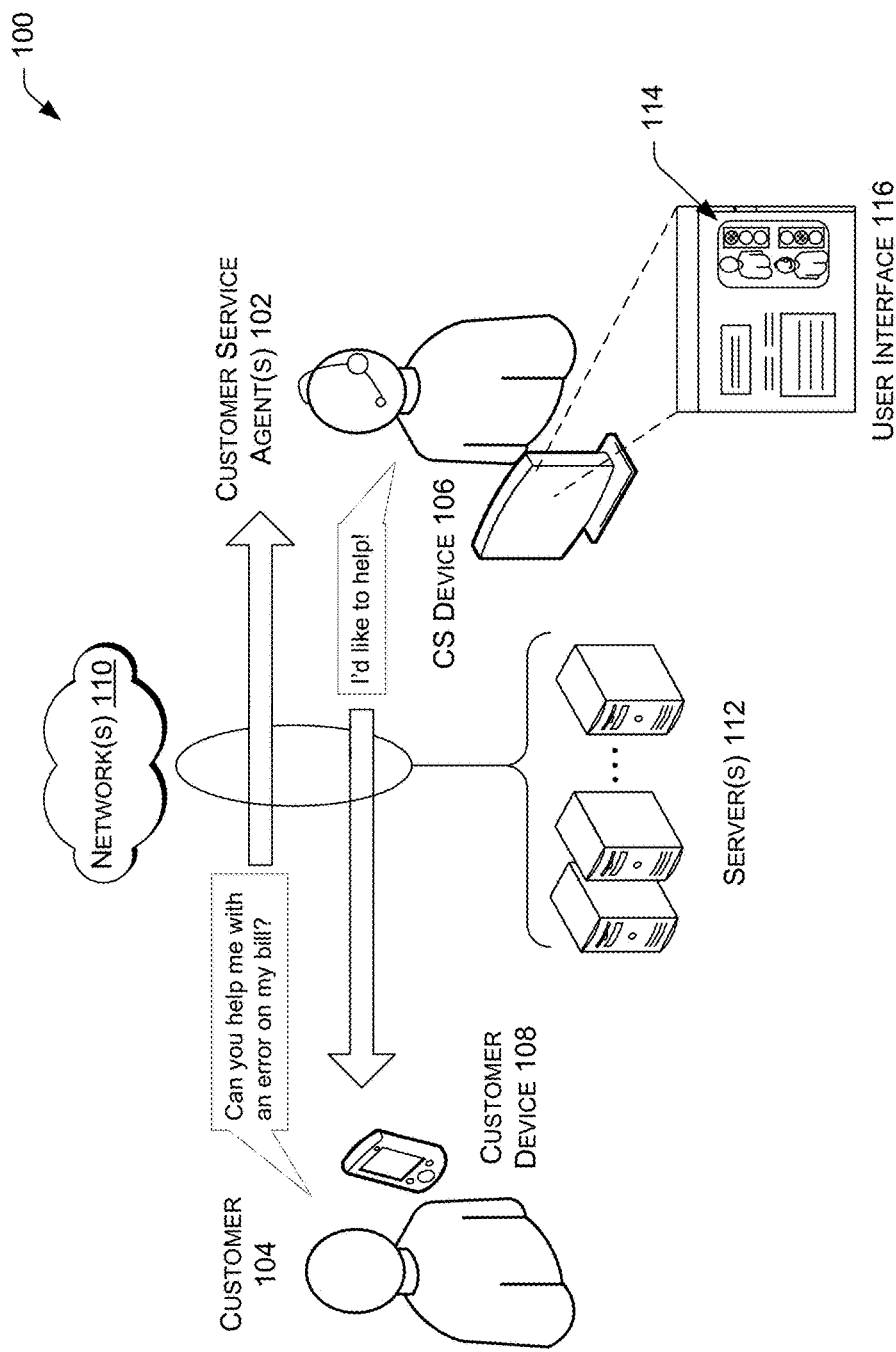
FIG. 1 is a schematic diagram of an illustrative environment usable to provide automated conversation feedback.

This disclosure is generally directed to analyzing a communication involving participants and providing visual feedback for one of more of the participants during or after the conversation. The visual feedback may enable a participant to improve communication or otherwise provide more effective communication during a conversation and/or in subsequent conversations. The conversation may be a voice call conversation and/or possibly other types of conversations, such as an instant message conversation, an email conversation, a video communication, and other types of conversations where the participants are using devices to communicate with one another. Although example communications that are discussed below primarily describe a voice call between a customer and a customer service (CS) agent, other quantities of participants or types of participants may be involved in the communication.

In some embodiments, an application may analyze a communication between a customer and a CS agent. The analysis may include measuring attributes of the communication, such as volume, diction, pitch, speed of talking, and so forth for each participant. In some embodiments, the analysis may include analyzing words after spoken words are converted to text via an automatic speech recognition (ASR) system. The analysis may also identify and track other non-word events during a conversation, such as amount of pauses greater than a threshold amount of time (i.e., dead-space during a call where nobody is talking), emotional sounds (e.g., laugh, sigh, grunt, etc.), habitual sounds (e.g., uh, like, or other hesitation sounds), and/or other sounds.

The application may also access historical information associated with the customers, CS agents, and/or other participants to enable tracking of attributes and comparing attributes across multiple conversations. The application may also capture contextual information about the conversation, such as customer wait time, type of call (e.g., place an order, dispute a bill, check order status, return item, etc.), customer profile information (e.g., prior purchases, browsing history, etc.), and so forth. In various embodiments, a call profile may be created based on some attributes of a communication and/or attributes of a customer, which may be used for comparison purposes (e.g., by associating with trends from other customers, etc.).

The application may summarize information from the analysis and output visual information to the CS agent and/or other participants to enable identification and tracking of the conversation attributes in real-time or near real-time (e.g., during the conversation). In some embodiments, the visual output may be a simple icon, value, or other output that indicates a mood (e.g., psychological state, feelings, state-of-mind, etc.), level of success, or other indicator derived from one or more of the attributes. For example, the visual output may be depicted as a facial expression (e.g., an emoticon, etc.) that estimates a level of happiness or satisfaction of the customer or other participant based on the attributes determined during the conversation. As another example, a stoplight icon may present one of a red, yellow, or red light based on the attributes to indicate whether to do more of the same type of conversation (green), change a conversation style (red), or consider changing a conversation style (yellow). The application may provide other visual outputs, such as a time series graph that shows the attributes or information derived from the attributes, end of conversation summaries, historical summaries, and/or other visual outputs that use the attributes.

In various embodiments, the application may provide training guidance, coaching tips, and/or other feedback to the CS agent, via a visual output or other type of output. The feedback may reference a playbook or training manual that provides guidelines for a task or job of the CS agent.

The techniques and systems described herein may be implemented in a number of ways. Example implementations are provided below with reference to the following figures.

FIG. 1 is a schematic diagram of an illustrative environment 100 usable to provide automated conversation feedback. The environment 100 includes a customer service (CS) agent 102 that converses with a customer 104. The CS agent 102 may communicate through a CS device 106 that is in communication with a customer device 108 via one or more networks 110. The networks 108 may be wired networks, wireless networks, or a combination of both. The CS device 106 and the customer device 108 may be any combination of a headset, telephone, mobile telephone, computer, Voice-over-Internet Protocol (VoIP) device, and/or other type of audio and/or text-based communication device. For example, the CS agent 102 may conduct a voice communication with the customer 104 via the CS device 106 and the customer device 108. The conversation may be a voice communication, a video communication, and/or a text-based communication. For example, the CS agent 102 may assist the customer 104 by instant exchanging text-based messages, and then initiate a VoIP call later in a conversation.

One or more servers 112 may analyze the communication. The analysis may be performed in real-time or near real-time (during the conversation) to enable feedback to the CS agent 102, and possibly to the customer 104, regarding performance of the conversation. For example, the servers 112 may provide a visual output 114 via a user interface (UI) 116 that indicates an estimated state of mind of the customer 104 (e.g., happy, upset, ambivalent, etc.) and/or other information about the customer 104, about the CS agent, and/or about the conversation. Details about the analysis and visual output 114 are included below with reference to at least FIGS. 3-10. The servers 112 may access the communication via the network 110. In some embodiments, the servers 110 may interact with or perform the operations of the CS device 106. In some embodiments, the servers 112 may host the communication, such as by facilitating a conference of participants, for example. The servers 112 may be part of a call center used to provide customer support.

The servers 112 may provide analysis of other types of communications besides communications between the CS agent 102 and the customer 104. For example, the servers 112 may facilitate a conference system with multiple participants, and may monitor attributes associated with different ones of the participants. These attributes may then be used to create visual outputs that allow at least some of the participants to assess the conversation, for example. Other uses are also possible that involve any number of participants that communication with assistance of a device that captures the communication comprised of at least sound and/or text.

Figure 2:
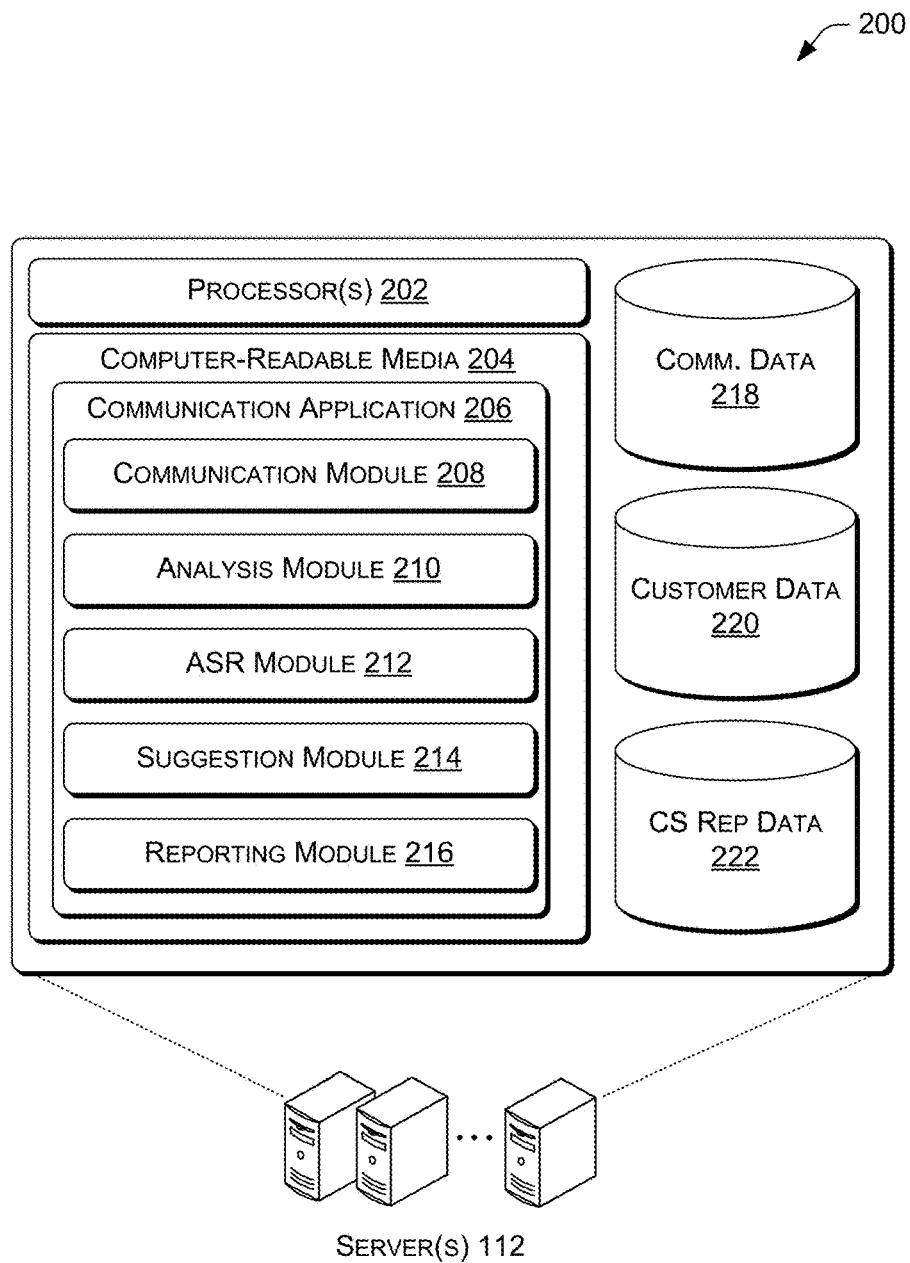
FIG. 2 is a schematic diagram of an illustrative computing architecture to provide automated conversation feedback.

FIG. 2 is a schematic diagram of an illustrative computing architecture 200 to provide automated conversation feedback. The computing architecture 200 may be implemented in the servers 112 in a distributed computing environment or non-distributed computing environment.

The computing architecture 200 may include one or more processors 202 and one or more computer-readable media 204 that stores various modules, applications, programs, services or other data. Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

The computer-readable media 204 may include instructions that, when executed by the one or more processors 202, cause the processors to perform the operations described herein. In some embodiments, the computer-readable media 204 may store a communication application 206 that may include a communication module 208, an analysis module 210, an ASR module 212, a suggestion module 214, and/or a reporting module 216. The modules are described in turn. The modules may be implemented in a distributed or non-distributed computing environment. The servers 112 may also access, modify, and/or interact with various data including communication data 218, customer data 220, and CS agent data 220, which may be stored local and/or remote from the servers 112.

The communication module 208 may connect to a communication and monitor the communication involving participants such as the CS agent 102 and the customer 104. In various embodiments, the communication module 208 may store communication data 218 for future use, such as for training purposes. In some embodiments, the communication module 208 may announce the monitoring and/or request consent from the participants prior to the monitoring. The monitoring may enable extracting attributes by the analysis module 210, but may not monitor an actual dialog or content of the conversation, but rather the attributes (e.g., indicators), which may indicate communication style, mood of participants (e.g., psychological state, feelings, state-of-mind, etc.), and other information that is different than the actual dialog of participants. In some embodiments, the communication module 208 may host the communication, such as by acting as a call router, a conference bridge, or other communication facilitator. The communication module 208 may cause the one or more processors 202 to access audio signals of a conversation between the customer 104 and the CS 102 agent that assists the customer with a task.

The analysis module 210 may analyze the communication between the customer 104 and the CS agent 102. The analysis module 210 may measure or track attributes of the communication, such as volume, diction, pitch, speed of talking, and so forth for one or more participants of the communication, and possibly for each participant individually. In some embodiments, the analysis may include analyzing words after spoken words are converted to text via the automatic speech recognition (ASR) module 212. The analysis may also identify and track other non-word events during a conversation, such as amount of pauses greater than a threshold amount of time (i.e., dead-space during a call where nobody is talking), emotional sounds (e.g., laugh, sigh, grunt, etc.), habitual sounds (e.g., uh, like, etc.), and/or other sounds. In some embodiments, the analysis module 210 may access historical information on the customers, CS agents, and/or other participants to enable tracking of attributes and comparing attributes across multiple conversations and/or across multiple types of conversations (e.g., text, voice, video, etc.). The analysis module 210 may capture contextual information about the conversation, such as customer wait time, type of call (e.g., place an order, dispute a bill, check order status, return item, etc.), customer profile information (e.g., prior purchases, browsing history, etc.), and so forth. In various embodiments, the analysis module may create, modify, and/or access a call profile that includes at least some attributes of a communication and/or attributes of a customer, which may be used for comparison purposes (e.g., by associating with trends from other customers, etc.). Thus, information about a communication may be mapped to specific user information and/or to a generic profile that is associated with the communication (e.g., associated via a profile, call type, etc.). The analysis module 210 may track attributes of audio signals where the attributes quantify aspects of the conversation based on talking by the customer 104 and the CS agent 102. The analysis module 210 may generate mood imagery based on the tracked attributes for at least the customer. The analysis module 210 may store and/or modify information in the customer data 220 and/or CS agent data 220.

The ASR module 212 may perform automatic speech recognition and/or access a different service (e.g., a third party service) to have spoken words converted to text, which can then be analyzed by the analysis module 210. For example, the mode of the conversation may be determined in part on how many words have a positive connotation and how many words have a negative connotation are included in the conversation without tracking the actual dialog of the conversation. The text of words used in the conversation may also be used to ensure proper information was exchanged (e.g., financing information, warranty information, disclaimers, etc.), which may be part of the CS agents job to communicate during some communications.

The suggestion module 214 may provide training guidance, coaching tips, and/or other feedback to the CS agent, via the reporting module. The feedback may reference a playbook or training manual that provides guidelines for a task or job of the CS agent. The suggestion module 214 may generate the suggestions based on the occurrence of specific words in the communication and/or based on the attributes tracked by the analysis module 210.

The reporting module 216 may summarize information from the analysis and output visual information to the CS agent 102, the customer 104, and/or other participants to enable identification and tracking of the conversation attributes in real-time or near real-time (e.g., during the conversation). In some embodiments, the visual output may be a simple icon, value, or other output that indicates a mood (e.g., psychological state, feelings, state-of-mind, etc.), level of success, or other indicator derived from one or more of the attributes. For example, the visual output may be a facial expression (e.g., an emoticon, etc.) that estimates a level of happiness or satisfaction of the customer or other participant based on the attributes determined during the conversation. As another example, a stoplight icon may present one of a red, yellow, or red light based on the attributes to indicate whether to do more of the same type of conversation (green), change a conversation style (red), or consider changing a conversation style (yellow). The reporting module may provide other visual outputs, such as a time series graph that shows the attributes or information derived from the attributes, end of conversation summaries, historical summaries, training interfaces, and/or other visual outputs that use the attributes. The reporting module 216 may use one or more of the communication data 218, the customer data 220, and the CS agent data 220 to create the visual outputs. The reporting module 216 may cause visual output of the mood imagery for viewing by the CS agent, the mood imagery indicating an estimation of the customer's state of mind during a time period of the conversation.

The customer data 220 may include data from a current communication, from prior communications, and/or from other interactions. Non-limiting examples of the customer data 220 may include data pertaining to elements viewed, purchases, support requests, reviews given, ratings given, tasks completed, session duration, resources accessed, and so forth. By having access to the customer data 220, the suggestion module 214, and/or the reporting module 216 may generate more accurate and specific information to provide support to the customer and/or more accurately analyze attributes of a communication with the customer 104.

FIGS. 3, 4, 9, and 10 show illustrative processes that are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 3:
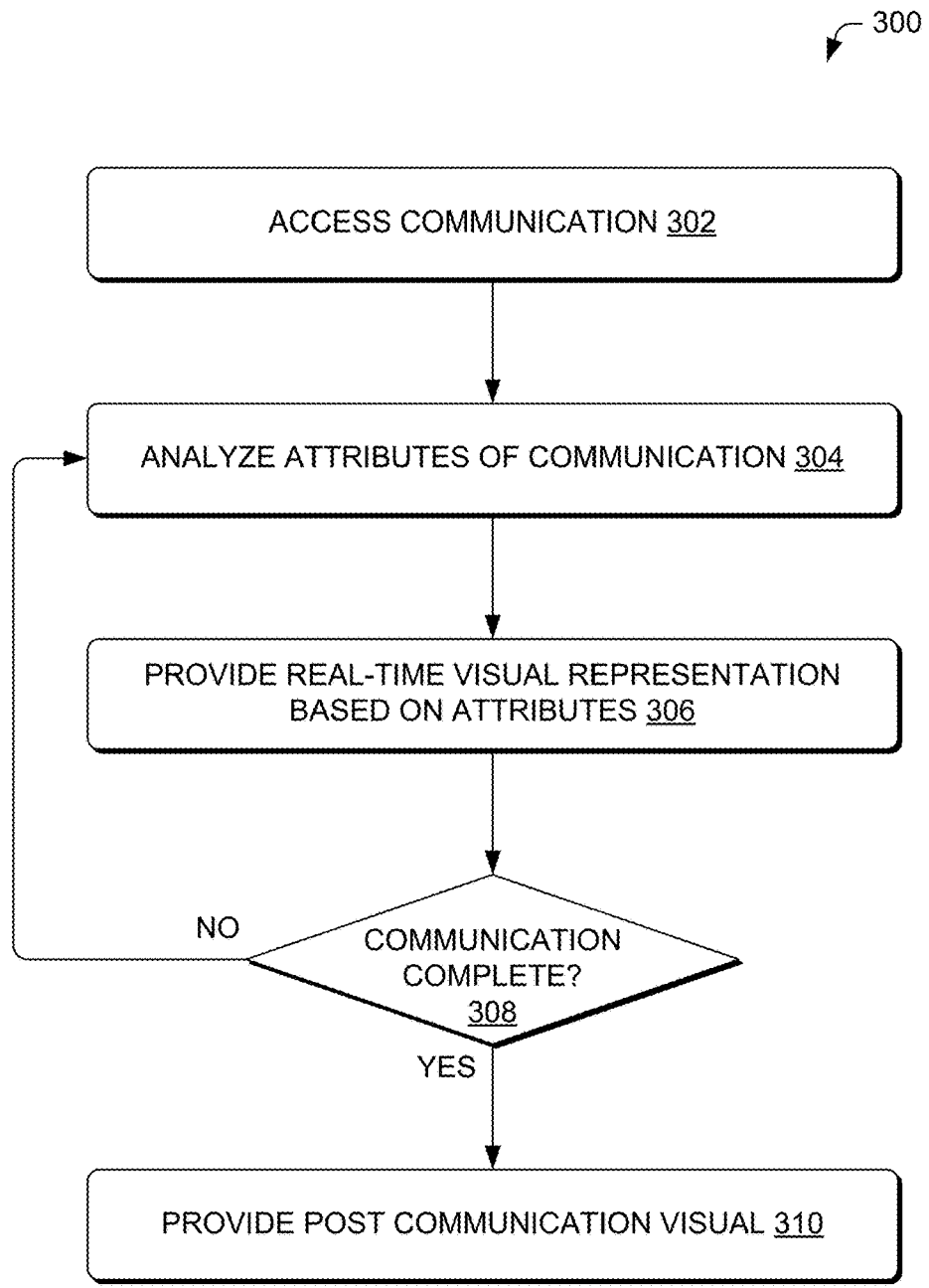
FIG. 3 is a flow diagram of an illustrative process to provide real-time visual representations as conversation feedback.

FIG. 3 is a flow diagram of an illustrative process 300 to provide real-time visual representations as conversation feedback. The process 300 is described with reference to the environment 100 and the computing architecture 200. Alternatively, process 300 may be performed in other similar and/or different environments.

At 302, the communication module 208 may access the communication. For example, the communication module 208 may connect participants of a call, connect participants of a text-exchange service, connect participants of a video conference, and/or monitor such communications that may be hosted by other services.

At 304, the analysis module 210 may analyze attributes of the communication. For example, the analysis module 210 may analyze the communication to extract data to determine one or more of the following (without limitation).

pitch and/or variations thereof
diction
participant speech volume and/or variations thereof
speed of speech and/or variations thereof
environmental sounds (i.e., background noise such as a baby crying, wind, etc.)
non-word events during a conversation, such as amount of pauses greater than a threshold amount of time (i.e., dead-space during a call where nobody is talking)
emotional sounds (e.g., laugh, sigh, grunt, etc.)
habitual sounds (e.g., uh, like, etc.)
important words, which may indicate tasks, mood, etc.
wait time
call type (e.g., place an order, dispute a bill, check order status, return item, etc.)

The data may pertain to spoken words, typed words, and/or other communication that can be extracted from the data. For example, when the communication is a video conference, an audio signal component of the video conference may be analyzed to determine the attributes.

The analysis module 210 may further generate output information based on the analysis, such as by aggregating data, scoring attributes, and/or applying other rules and/or decisions to classify the conversation using at least some of the attributes. In some embodiments, the analysis module 210 may generate mood imagery based on the tracked attributes for at least the customer. The mood imagery may be used to select facial expressions for output by the reporting module. In various embodiments, the analysis module 210 may generate information to populate a color-coded display (e.g., a stop light representation, etc.) that provides visual feedback for the conversation, based on one or more of the attributes. In some embodiments, each attribute or some attributes may be assigned a color code for visual output and tracking.

At 306, the reporting module 216 may provide a real-time or near real time (i.e., during the communication) visual representation based on the attributes and/or other outputs of the analysis module 210. For example, the reporting module may select a facial expression based on the output from the analysis module 210, and may cause display of the facial expression (e.g., a smiling face to indicate that the conversation is good/positive, a frowning face to indicate that the conversation is poor/negative, etc.). Other visual output may include a time series graphs, color coded signals, and so forth.

At 308, the communication module 208 may determine whether the communication is complete. When the communication is not complete (following the "no" route from the decision operation 308), then the process 300 may continue at the operation 304 described above. When the communication is complete (following the "yes" route from the decision operation 308), then the process 300 may continue at an operation 310.

Figure 7:
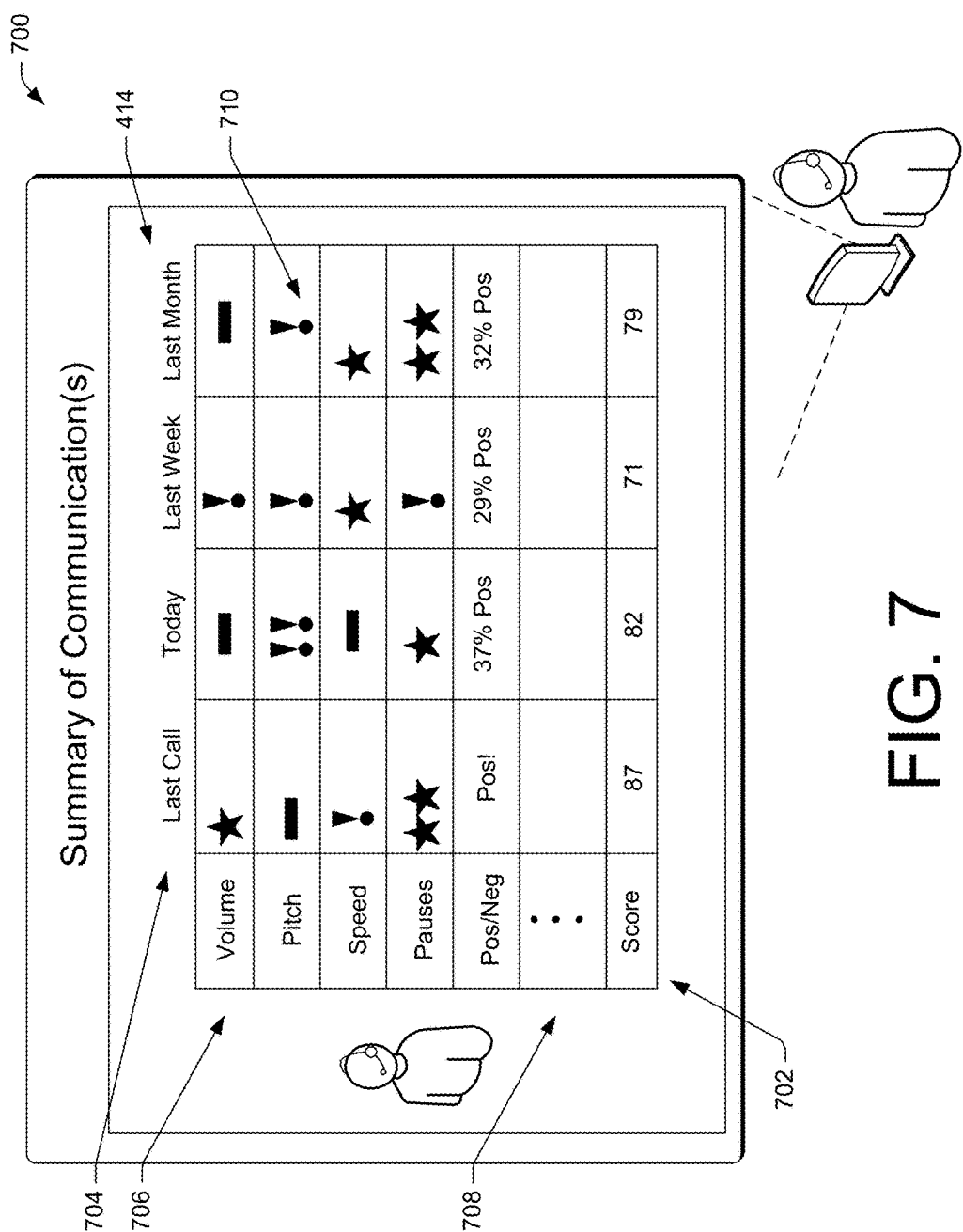
FIG. 7 shows an illustrative user interface that provides a post-communication summary as conversation feedback.
Figure 8:
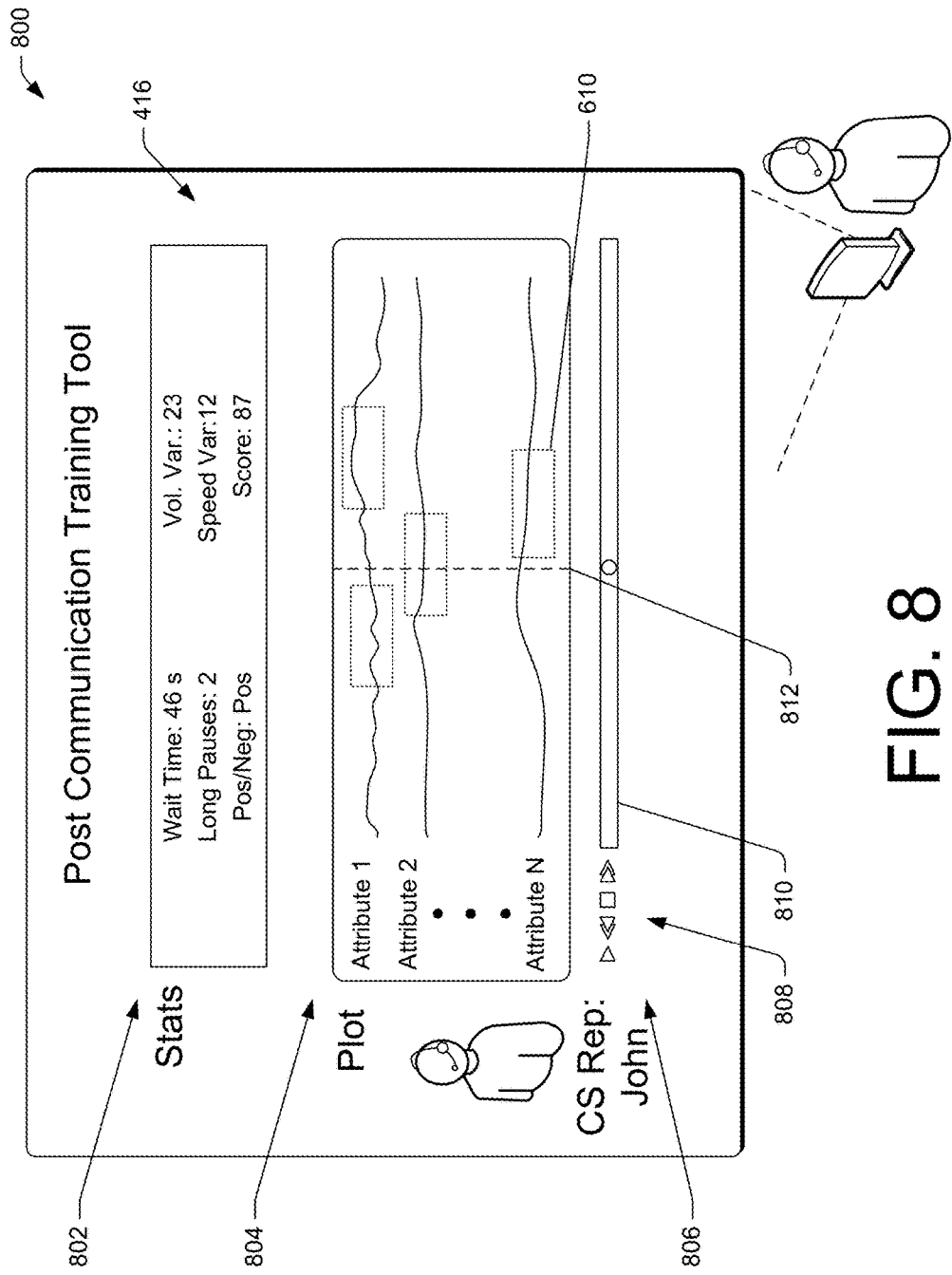
FIG. 8 shows an illustrative user interface that provides a post-communication training tool.

At 310, the reporting module may provide a post communication visual output. The post communication visual output may be a summary report of the communication and/or a group of communication (e.g., statistics for also call, last hour, last day, last week, and/or other time period or quantity). Examples of the post-communication visual output are shown in FIGS. 7 and 8.

Figure 4:
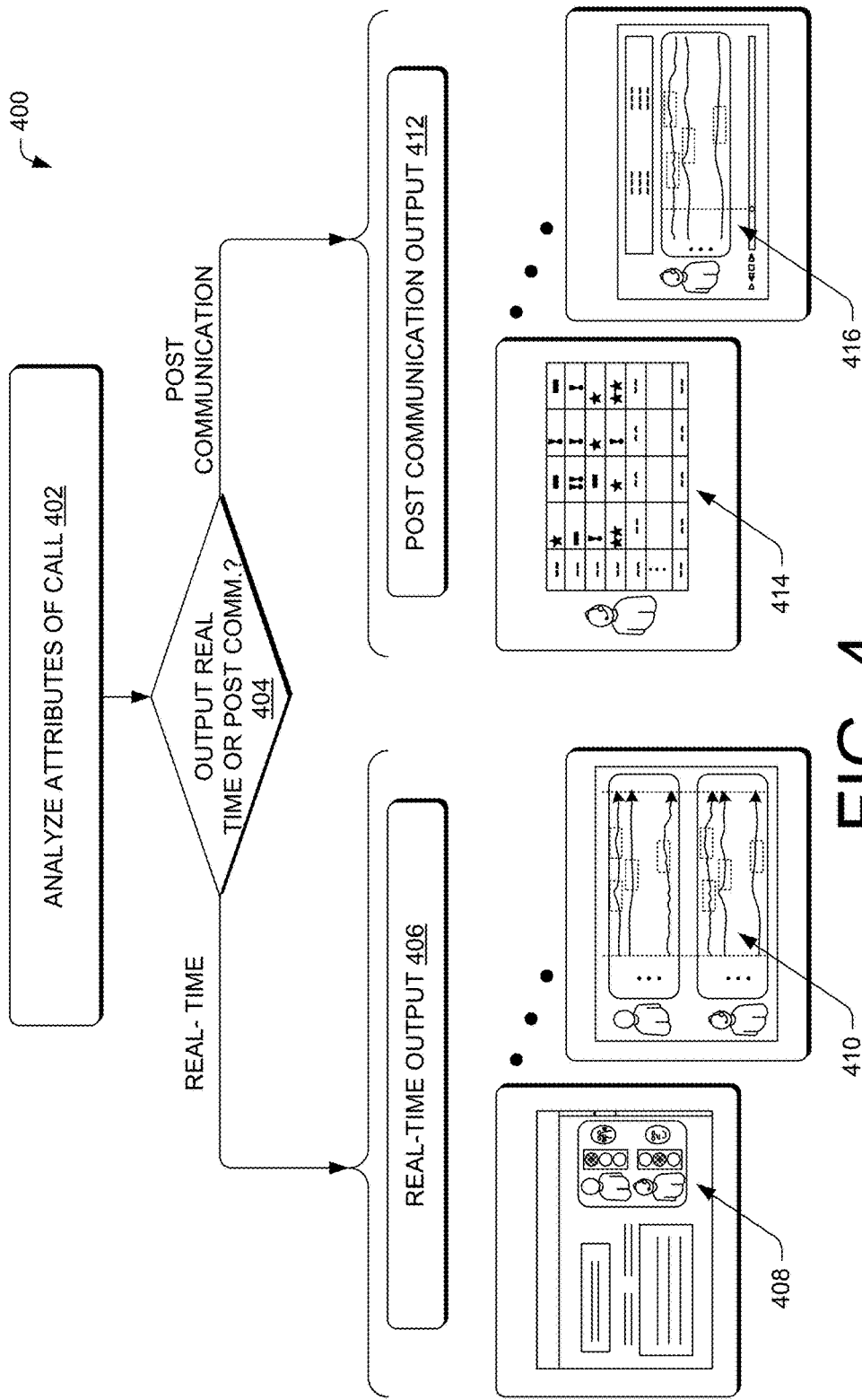
FIG. 4 is a flow diagram of an illustrative process to provide real-time and/or post-communication conversation feedback.

FIG. 4 is a flow diagram of an illustrative process 400 to provide real-time or post-communication conversation feedback. The process 400 is described with reference to the environment 100 and the computing architecture 200. A person having ordinary skill will appreciate that process 400 may be performed in other similar and/or different environments.

At 402, the analysis module 210 may analyze, track, monitor, and/or extract attributes from a communication. The operation 402 may be similar to the operation 304 discussed above.

At 404, the reporting module 216 may determine whether to provide a real-time or near real-time (i.e., during the conversation) output. The determination may be based on a user input, an operation mode, and/or other inputs. When the reporting module 216 determines to provide the real-time or near real output (following the "real-time" route from the decision operation 404), then the process 400 may advance to an operation 406

Figure 5:
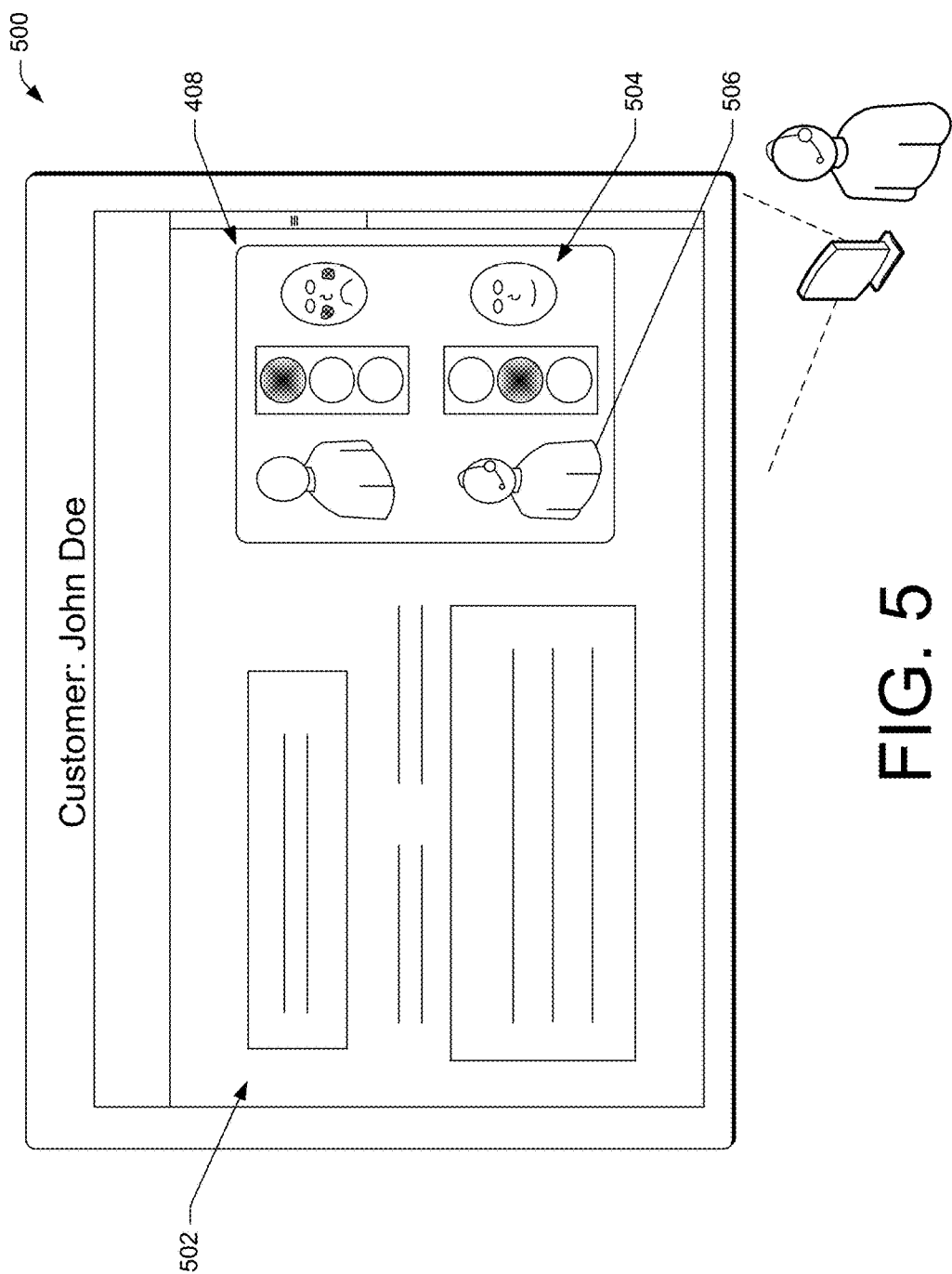
FIG. 5 shows an illustrative user interface that provides simplified real-time visual representations as conversation feedback.
Figure 6:
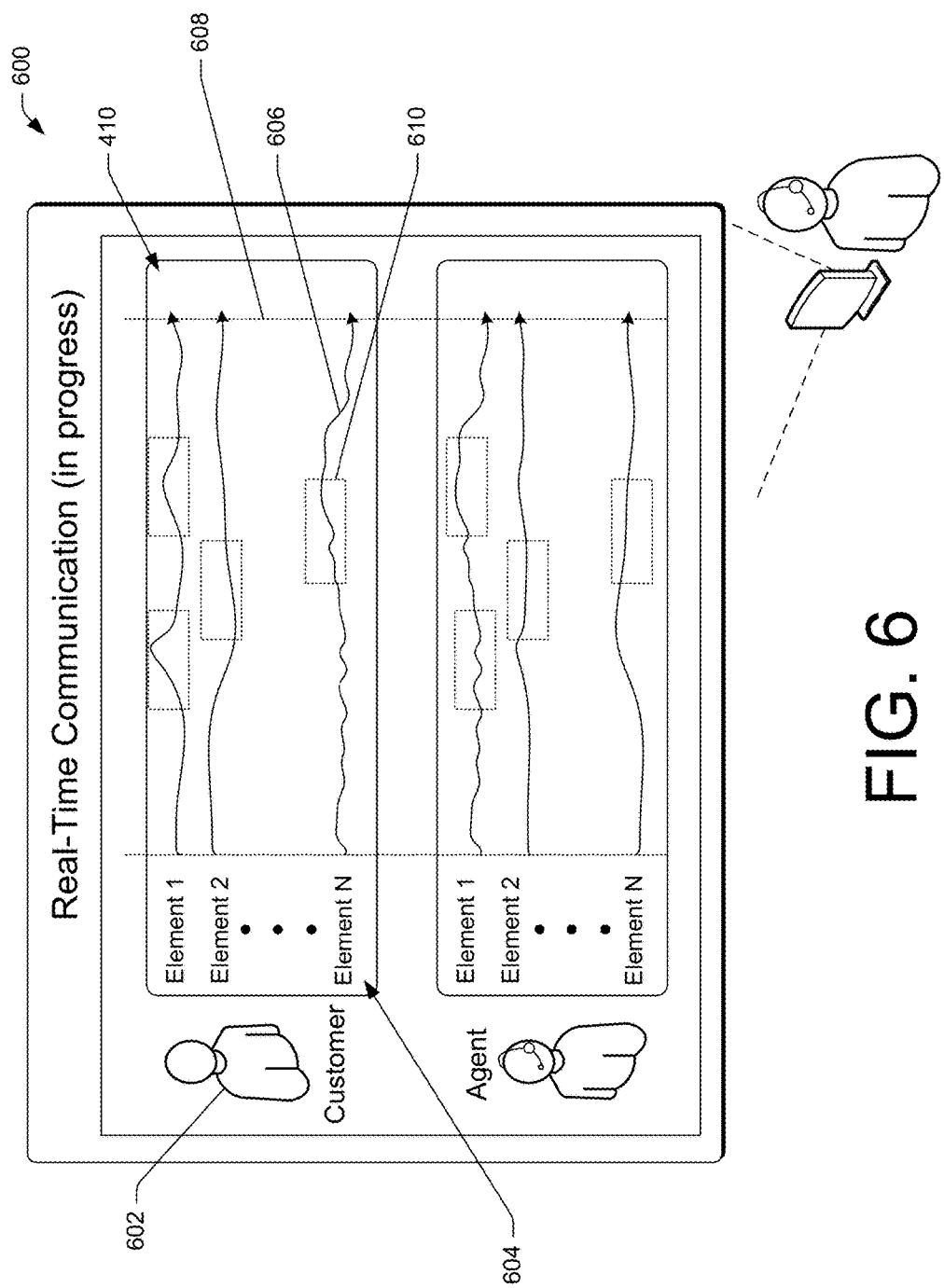
FIG. 6 shows an illustrative user interface that provides a time series graph as conversation feedback.

At 406, the reporting module 216 may output a real-time (or near real-time) visual output. The real-time output may be a simple indicator 408, which may show a facial expression, a colored signal, or other indicia based on the attributes from the operation 402. An example of the simple indicator 408 is shown in FIG. 5. The real-time output may be a time series graph 410, which may show visual indications of the attributes and/or data from the attributes over time, possibly up to a current time in the conversation. Thus, the time series graph 410 may show trends, progress, and/or changes as the conversation progresses. An example of the time series graph 410 is shown in FIG. 6. Other types of real-time visual outputs may be provided at 406.

When the reporting module 216 determines to provide the post communication output (following the "post communication" route from the decision operation 404), then the process 400 may advance to an operation 412. At 412, the reporting module 216 may output a post communication visual output. The post communication output may be a summary chart 414, which may show statistics over one or more different periods of time and/or quantity of communications (e.g., last five calls, last hour, etc.). The summary chart 414 may provide high level information, such as statistics for various attributes. The summary chart 414 may use colors, icons, shapes, and/or other visuals to draw attention to information and more easily convent the information. For example the summary chart 414 may use icons to represent positive and negative trends. An example of the summary chart 414 is shown in FIG. 7.

The post communication output may be a post-communication training tool, which may enable the CS agent 102 or another user to review a communication. The post-communication training tool 416 may provide visual information as well as access to the actual communication (e.g., via an audio file, text, etc.). An example of the post-communication training tool 416 is shown in FIG. 8. Other types of post communication visual outputs may be provided at 412.

FIG. 5 shows an illustrative user interface 500 that provides simplified real-time visual representations as conversation feedback. The UI 500 may show the simple indicator 408 described in the process 400. The UI 500 may include a workspace area 502 that is usable by the CS agent 102 to perform routine tasks, such as perform research, view product information, view customer information, and so forth. The simple indicator 408 may include one or more visual outputs 504 from the reporting module 216, which are associated with a participant 506 of the communication. For example, the visual output may include a facial expression that indicates a mood or estimated state of mind of the participant 506. When the attributes indicate that the user is relaxed, happy, and/or otherwise in a good mood, then the facial expression may show a smiling face. The attributes in this scenario may indicate a moderate and consistent pitch, consistent volume, consistent speed of words, and use of words with a positive connotation, which may be associated with a relaxed, happy, and/or otherwise good mood. When the attributes indicate that the user is not relaxed, unhappy, and/or otherwise in a bad mood, then the facial expression may show a frowning face. The attributes in this scenario may indicate an inconsistent pitch, an inconsistent volume, an inconsistent speed of words, and use of words with a negative connotation, which may be associated with a non-relaxed, unhappy, and/or otherwise bad mood. The visual output may be provided for multiple participants, such as for the customer 104 and the CS agent 102. By displaying the information for the CS agent 102, the CS agent may adjust behavior to improve the mood of the customer 104, and thus cause the visual output of the facial expression to reflect this change in mood, for example. In some embodiments, the CS agent 102 may be associated with a different visual output type than the customer 104. For example, the CS agent 102 may be associated with a color coded signal (e.g., a traffic signal indicator to suggest more (green), less (yellow), change course (red), etc.), while the customer 104 may be associated with the facial expression to help the CS agent 102 evaluate a mood of the customer 104.

FIG. 6 shows an illustrative user interface 600 that provides a time series graph as conversation feedback. The UI 600 may show the time series graph 410 described in the process 400. The UI 600 may provide the time series graph 410 for a designated participant 602, such as the customer 104, the CS agent 102, and/or other participants. The time series graph 410 may include elements 604 that are visually presented by a moving indicator 606 (e.g., a line, etc.). The moving indicator 606 may include a plot that shows historical measurements of the element up to a current point in time 608. Thus, the time series graph 410 shows both real-time or near real-time data and historical data (e.g., from earlier in a call, from the last hour, etc.). The elements 604 may be attributes and/or information derived from the attributes. For example, the elements 604 may be a measure of volume, diction, pitch, speed of spoken words, and/or other attributes. The elements 604 may be a score, an indicator of positive/negative tone, and/or other derived information. In some embodiments, signals 610 may include points in a conversation that indicate an improvement/degradation, areas to focus on, areas for review, and/or other information, thereby highlighting portions of the moving indicator such as by colors, an icon, a selector, and/or other designators. In some embodiments, a user may review sections of a conversation associated with the signals 610, for example, as a training technique. Thus, the user may identify what caused the element to drop or rise, and so forth. The UI 600 may provide time series graphs for other participants, which may or may not include the same elements.

FIG. 7 shows an illustrative user interface 700 that provides a post-communication summary as conversation feedback. The UI 700 may show the summary chart 414 described in the process 400. The UI 700 shows summaries, trends, and/or other information for elements 702 for a group of communications 704. The group of communications 704 may include groupings by time period, groupings by quantity, and/or other groupings. The elements 702 may be the same or similar to the elements 604 described with reference to FIG. 6. Basic elements 706 may be mapped directly or closely with attributes from the analysis module 210. Derived elements 708 may be based on combinations of attributes and/or derived from attributes. Examples of the derived elements 708 include a positive/negative rating of the communication, a score, a mood, but many other examples exist. Visual displays 710 may be associated with the elements 702 to indicate an outcome for the element for a group. For example, the visual displays 710 may include icons such as stars that indicate good behavior and exclamation points that indicate areas for improvement. A dash may indicate a neutral rating. Some of the visual displays may include text, such as a rating of "Pos" (i.e., "positive"), but may be expressed numerically when aggregated with other communications. Scores may be numerical, include letter grades, and/or other indicators. The visual displays 710 may be color coded to indicate areas of concern and/or areas that need more focus. Improvements may also be indicated in the visual display, such as suing colors or other techniques (bold, underline, etc.).

FIG. 8 shows an illustrative user interface 800 that provides a post-communication training tool. The UI 800 may show the post-communication training tool 416 described in the process 400. In some embodiments, the UI 800 may be accessibly by exploration and/or interaction with the UI 700. The UI 800 may include a statistics section 802, which may include high level statistics about a conversation or group of conversations. For example, the statistics section 802 may indicate a wait time experienced by a customer before talking with the CS agent 102, long pauses after initiating the conversation (e.g., put on hold), a positive/negative rating, a volume variance value/grade, a speed variance value/grade, and an overall value/grade. The UI 800 may include a plot section 804 that is similar to the time series graph 410. The plot section 804 may be aligned with or associated with an audio controller 806, which may include audio controls 808 and a player timeline 810 and timeline. By aligning the plot section 804 and the audio controller 806, a user may be able to control review of the communication to enable focusing on review of critical areas or areas of interest, such as the areas that include the signals 610. The user may then move a play time indicator 812 to an area before one of the signals 610, for example.

Figure 9:
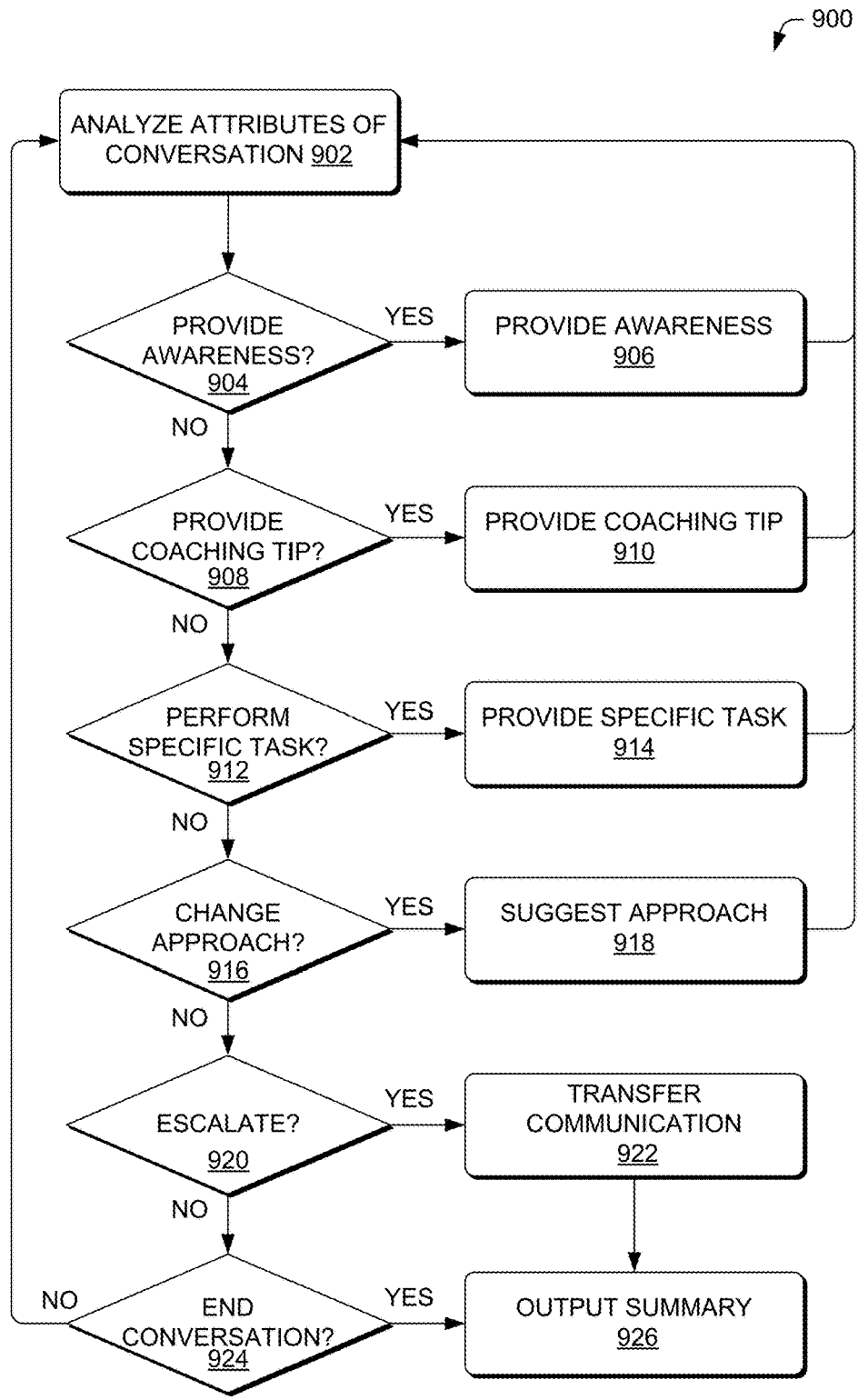
FIG. 9 is a flow diagram of an illustrative process to provide suggestions and other feedback during a conversation.

FIG. 9 is a flow diagram of an illustrative process 900 to provide suggestions and other feedback during a conversation. The process 900 is described with reference to the environment 100 and the computing architecture 200. Of course, the process 900 may be performed in other similar and/or different environments.

At 902, the analysis module 210 may analyze attributes of the conversation. The operation 902 may be similar to the operations 304 and 402 discussed above. The analysis module may also include historical data, which is discussed below with reference to FIG. 10.

At 904, the reporting module 216 may determine whether to provide awareness information, such as by providing or updating a visual output that indicates information, statistics, and other measureable information to the CS agent 102 or another user. For example, the awareness information may be the visualization of the mood of the customer 104 shown in FIG. 5, for example. When the awareness information is determined to be provided (following the "yes" route from the decision operation 904), then the reporting module 216 may provide the awareness information at 906. The process 900 may then return to the operation 902 for further processing. When the awareness information is determined not to be provided or has already be provided (following the "no" route from the decision operation 904), then the reporting module 216 may advance to an operation 908.

At 908, the suggestion module 214 may determine whether to provide a coaching tip, such as by providing or updating a visual output that indicates coaching information to the CS agent 102 or another user. For example, the coaching tip may include a note to slow a rate of speech, use a certain word or utterance less frequently, take a pause, provide empathy, and so forth. When the coaching tip is determined to be provided (following the "yes" route from the decision operation 908), then the suggestion module 214 may provide the coaching tip at 910. For example, the coaching tip may be provided as a pop-up tip, a dialog box, an icon, and/or using other visual or audio communications. The process 900 may then return to the operation 902 for further processing. When the coaching tip is determined not to be provided or has already be provided (following the "no" route from the decision operation 908), then the suggestion module 214 may advance to an operation 912.

At 912, the suggestion module 214 may determine whether to provide a specific task to the user, such as by providing a reminder to provide certain information to the CS agent 102 or another user. For example, the specific task may be a reminder to provide information on a return policy or other policy, provide a financing offer or other offer, and/or provide other information, which may be prompted after analysis of the conversation (e.g., possibly after conversion of speech via the ASR module 212) and/or after other events (e.g., input by CS agent 102, etc.). When the specific task is determined to be provided (following the "yes" route from the decision operation 912), then the suggestion module 214 may provide the specific task at 914. For example, the specific task may be provided as a pop-up tip, a dialog box, an icon, and/or using other visual or audio communications. The process 900 may then return to the operation 902 for further processing. When the specific task is determined not to be provided or has already be provided (following the "no" route from the decision operation 912), then the suggestion module 214 may advance to an operation 916.

At 916, the suggestion module 214 may determine whether to suggest a different communication approach to the user, such as by providing a suggestion of a change in communication to the CS agent 102 or another user. For example, the suggestion of a different communication approach may be a suggestion to empathize, to listen to the customer, to explain a policy, to use a logical argument, to read a scripted response, and/or to perform other actions. The suggestion to try a different communication approach may be triggered in response to the attributes of the conversation, such as when the attributes indicate that the conversation is not positive and/or effective. When the suggestion to provide a different communication approach is determined to be provided (following the "yes" route from the decision operation 916), then the suggestion module 214 may provide the suggestion to provide a different communication approach at 918. For example, the suggestion to provide a different communication approach may be provided as a pop-up tip, a dialog box, an icon, and/or using other visual or audio communications. The process 900 may then return to the operation 902 for further processing. When the suggestion to provide a different communication approach is determined not to be provided or has already be provided (following the "no" route from the decision operation 916), then the suggestion module 214 may advance to an operation 920.

At 920, the suggestion module 214 may determine whether to suggest escalating the communication to a supervisor or another person, and thus passing it off or transferring it to a different person. The suggestion to escalate the communication may be triggered in response to the attributes of the conversation, such as when the attributes indicate that the conversation is not positive and/or effective and/or after a predetermined amount of time has elapsed. When the suggestion to escalate is determined to be provided (following the "yes" route from the decision operation 920, then the suggestion module 214 may transfer the communication at 922. The process 900 may then return to the operation 902 for further processing. When the suggestion to escalate is determined not to be provided or has already be provided (following the "no" route from the decision operation 920, then the suggestion module 214 may advance to an operation 924.

At 924, the communication module 208 may determine whether the conversation has ended. When the communication has not ended (following the "no" route from the decision operation 924), then the process 900 may then return to the operation 902 for further processing. When the communication has ended (following the "yes" route from the decision operation 924), or following the operation 922, the process 900 may advance to an operation 926.

At 926, the reporting module may provide a post communication visual output. The post communication visual output may be a summary report of the communication and/or a group of communication (e.g., statistics for also call, last hour, last day, last week, and/or other time period or quantity). Examples of the post-communication visual output are shown in FIGS. 7 and 8.

Figure 10:
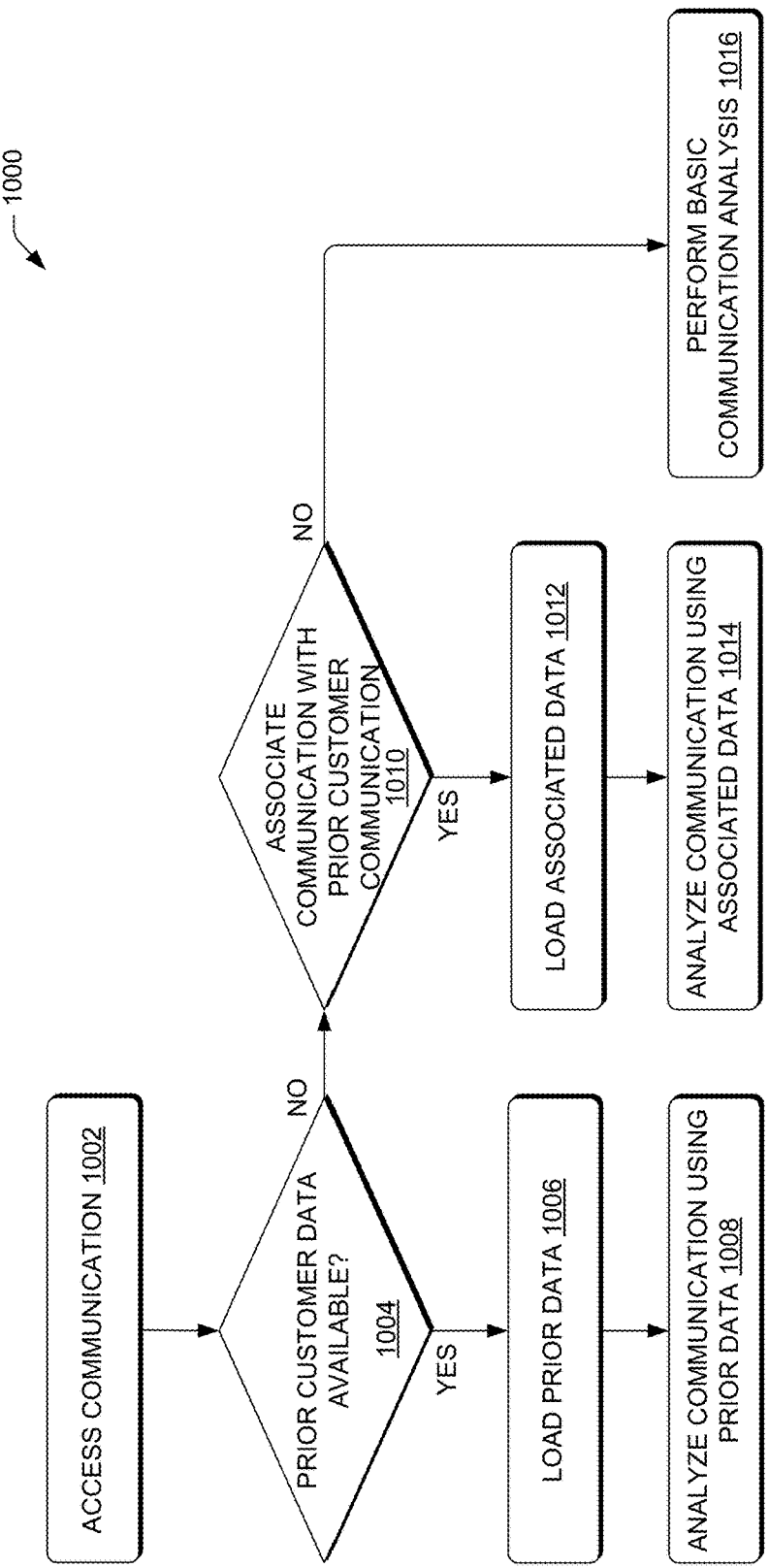
FIG. 10 is a flow diagram of an illustrative process to leverage historical information in an analysis of a communication.

FIG. 10 is a flow diagram of an illustrative process 1000 to leverage historical information in an analysis of a communication. The process 1000 is described with reference to the environment 100 and the computing architecture 200. Of course, the process 1000 may be performed in other similar and/or different environments. The process 1000 may be used to provide more complete analysis at the operations 304, 402, and/or 902, for example.

At 1002, the communication module 208 may access the communication. For example, the communication module 208 may connect participants of a call, connect participants of a text-exchange service, and/or monitor such communications that may be hosted by other services.

At 1004, the analysis module 210 may determine whether prior customer data is available from the communication data 218 and/or the customer data 220. The prior customer data may be used as a baseline for comparisons for a current communication, for providing input to the suggestion module (e.g., what worked in a prior similar scenario, etc.), and/or other information that may be used to inform the CS agent 102 and/or provide visual output to improve effectiveness of a current communication. When prior customer data is available (following the "yes" route from the decision operation 1004), then the process 1000 may advance to an operation 1006 to obtain the prior customer data from the communication data 218 and/or from the customer data 220. At 1008, the analysis module 210 may analyze the communication using the prior customer data. When prior customer data is not available (following the "no" route from the decision operation 1004), then the process 1000 may advance to a decision operation 1010.

At 1010, the analysis module 210 may determine whether to associate the communication accessed at the operation 1002 with a prior customer communication via the communication data 218 and/or the customer data 220. The association may map a similar communication type or profile to the current communication, which may then be used as a baseline for comparisons for the current communication, for providing input to the suggestion module (e.g., what worked in a prior similar scenario, etc.), and/or other information that may be used to inform the CS agent 102 and/or provide visual output to improve effectiveness of a current communication. For example the similar communication may be a generic communication profile for a particular type of call (e.g., a return, a lost package, a billing dispute), a specific communication from a customer that closely matches the current customer, and/or by other matching or association techniques. When the association is to occur (following the "yes" route from the decision operation 1010), then the process 1000 may advance to an operation 1012 to obtain the associated customer data from the communication data 218 and/or from the customer data 220 as discussed above. At 1014, the analysis module 210 may analyze the communication using the associated customer data. When associating is determined not to be feasible or otherwise not elected (following the "no" route from the decision operation 1010), then the process 1000 may advance to an operation 1016. At 1016, the analysis module 210 may perform a basic communication analysis, such as the analysis described above for the operation 304.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
   one or more processors;
   memory; and
   one or more computer-executable instructions that are stored in the memory and that are executable by the one or more processors to:
   access audio signals of a conversation between a customer and a customer service (CS) agent;
   track attributes of the audio signals, one or more attributes of the attributes quantifying aspects of the conversation based at least in part on words spoken by the customer and the CS agent;
   determine that the one or more attributes include one or more pauses greater than a threshold amount of time;
   determine mood imagery based at least in part on the one or more attributes, the mood imagery indicating a first estimation of a state of mind of the customer during a first time period of the conversation;
   determine that the mood imagery includes a first facial expression, the first facial expression being selected from a plurality of facial expressions based at least in part on analyzing the one or more attributes and being associated with the first estimation of the state of mind of the customer;
   generate a first communication suggestion for the CS agent based at least in part on analyzing the conversation and the first estimation of the state of mind of the customer, the first communication suggestion including a first suggestion to at least one of decrease a rate of speech, or use a word or utterance less frequently;
   generate a first time series graph indicating a measured element associated with the one or more attributes, the one or more attributes including at least one of a volume, a pitch, or a speed of spoken words of at least the CS agent;
   generate a second time series graph indicating a score for the CS agent, the score based at least in part on aggregating the attributes, the attributes including the volume, the pitch, and the speed of the spoken words; and
   cause first visual output of the mood imagery, the first time series graph, the second time series graph, and the first communication suggestion for view by the CS agent, wherein the mood imagery includes the first facial expression being updated in real-time or near real-time based at least in part on a change of the first estimation of the state of mind of the customer.

2. The system as recited in claim 1, wherein the computer-executable instructions are further executable by the one or more processors to:
   determine that a second estimation of the state of mind of the customer during a second time period of the conversation is either neutral or negative, the second time period being after the first time period;
   generate a second communication suggestion for the CS agent based at least in part on the second estimation of the state of mind of the customer, the second communication suggestion including a second suggestion that is different from the first suggestion; and
   cause second visual output of the second communication suggestion based at least in part on a determination that the first communication suggestion has been visually output.

3. The system as recited in claim 2, wherein the computer-executable instructions are further executable by the one or more processors to determine that the mood imagery includes a second facial expression, the second facial expression being selected from the plurality of facial expressions based at least in part on analyzing the one or more attributes and being associated with a third estimation of a third state of mind of the CS agent.

4. The system as recited in claim 1, wherein the computer-executable instructions are further executable by the one or more processors to determine that the mood imagery includes a color indicator that is indicative of a color of multiple colors, each color of the multiple colors being associated with a different behavior adjustment signal for the CS agent.

5. The system as recited in claim 1, wherein the computer-executable instructions are further executable by the one or more processors to output a visual post-communication summary that is based at least in part on statistics generated from at least the one or more attributes of the conversation.

6. The system as recited in claim 1, wherein the mood imagery is updated during the conversation based at least in part on changes in the one or more attributes.

7. A method, comprising:
   electronically accessing, by one or more computing devices, a conversation between participants, the participants including a first participant and a second participant;
   tracking, by at least one of the one or more computing devices, attributes of the conversation, one or more attributes of the attributes quantifying one or more aspects of the conversation based at least in part on one or more words used by the participants;
   determining, by the at least one of the one or more computing devices, mood imagery based at least in part on the one or more attributes, the mood imagery indicating an estimation of a state of mind of the first participant during a time period of the conversation;
   determining, by the at least one of the one or more computing devices, that the mood imagery includes a facial expression, the facial expression being selected from a plurality of facial expressions based at least in part on analyzing the one or more attributes and the facial expression being associated with the estimation of the state of mind of the first participant;
   generating, by the at least one of the one or more computing devices, a first time series graph indicating a measured element associated with the one or more attributes, the one or more attributes including at least one of a volume, a pitch, or a speed of spoken words of at least the second participant;
   generating, by the at least one of the one or more computing devices, a second time series graph indicating a score for the second participant, the score based at least in part on aggregating the attributes, the attributes including the volume, the pitch, and the speed of the spoken words;

generating, by the at least one of the one or more computing devices, a coaching tip for the second participant based at least in part on analyzing the one or more attributes of the conversation, wherein the coaching tip includes a suggestion to at least one of decrease a rate of speech, or use a word or utterance less frequently;

determining, by the at least one of the one or more computing devices, that the coaching tip is to be provided to the second participant; and determining, by the at least one of the one or more computing devices and based at least in part on the one or more attributes, a visual output representing a segment of the conversation, the first time series graph, the second time series graph, and the mood imagery, wherein the mood imagery includes the facial expression being updated in real-time or near real-time based at least in part on a change of the estimation of the state of mind of the first participant.

8. The method as recited in claim 7, further comprising: determining that the conversation includes multiple segments; and
updating the visual output during the conversation based at least in part on changes in the one or more attributes for each of the multiple segments.

9. The method as recited in claim 7, further comprising determining that the one or more attributes include one or more pauses greater than a threshold amount of time and at least one of diction, pitch, volume, or speed of spoken words.

10. The method as recited in claim 7, further comprising hosting an audio conference that includes the participants.

11. The method as recited in claim 7, wherein the visual output depicts a second estimation of a second state of mind of the second participant.

12. The method as recited in claim 7, further comprising outputting a post communication summary based at least in part on statistics generated from at least the one or more attributes of the conversation.

13. The method as recited in claim 12, further comprising determining that at least some information in the post communication summary is derived from the one or more attributes of the conversation.

14. The method as recited in claim 7, wherein the visual output comprises a third time series graph indicating an additional measured element associated with the one or more attributes, the one or more attributes including at least one of a volume, a pitch, or a speed of spoken words of the first participant.

15. The method as recited in claim 7, further comprising providing access to a recording of the conversation in association with the first time series graph to enable review of the conversation.

16. A system comprising:
one or more processors; and
one or more non-transitory computer-readable media having computer executable instructions that, when executed, cause the one or more processors to:
determine one or more audio signals of a conversation between a first participant and a second participant;
track attributes of the one or more audio signals, one or more attributes of the attributes quantifying one or more aspects of the conversation based at least in part on one or more words used by the first participant and the second participant;
determine a visual conversation feedback output representing the conversation based at least in part on the one or more attributes;
determine that the visual conversation feedback output includes a facial expression, the facial expression being selected from a plurality of facial expressions based at least in part on analyzing the one or more attributes of the one or more audio signals, and the facial expression representing an estimation of a state of mind of the first participant during a first time period;
determine that the visual conversation feedback output further includes a first time series graph indicating a measured element associated with the one or more attributes, the one or more attributes including at least one of a volume, a pitch, or a speed of spoken words of at least the second participant;
determine that the visual conversation feedback output further includes a second time series graph indicating a score for the second participant, the score based at least in part on aggregating the attributes, the attributes including the volume, the pitch, and the speed of the spoken words;
cause visual output of the visual conversation feedback output for view by at least the second participant, the visual conversation feedback output including the facial expression being updated in real-time or near real-time based at least in part on a change of the estimation of the state of mind of the first participant;
generate a communication suggestion for the second participant based at least in part on the estimation of the state of mind of the first participant; and
cause the visual output to include the communication suggestion for view by the second participant.

17. The system as recited in claim 16, wherein the one or more non-transitory computer-readable media having computer executable instructions further cause the one or more processors to provide the visual conversation feedback output to at least the second participant in real-time or near real-time.

18. The system as recited in claim 16, wherein the one or more non-transitory computer-readable media having computer executable instructions further cause the one or more processors to determine that at least a portion of the conversation includes an exchange of text-based messages.

19. The system as recited in claim 16, wherein the one or more non-transitory computer-readable media having computer executable instructions further cause the one or more processors to:
perform automated speech recognition (ASR) on at least part of the conversation to generate text; and
determine that at least one of the one or more attributes is based at least in part on the text.

20. The system as recited in claim 19, wherein the one or more non-transitory computer-readable media having computer executable instructions further cause the one or more processors to generate a coaching tip to be provided to at least the second participant based at least in part on the at least one of the one or more attributes, the coaching tip including a note to perform at least one of slowing a rate of speech, using a certain word or utterance less frequently, or taking a pause.

* * * * *